PRESSURE PROVIDING DEVICE

Original Filed April 9, 1943 11 Sheets-Sheet 1

Inventor:
Win W. Paget.
by Louis A. Maxson,
Att'y.

PRESSURE PROVIDING DEVICE

Original Filed April 9, 1943 11 Sheets-Sheet 2

Inventor:
Wm W. Paget.
by Louis A. Maxson.
Att'y.

April 3, 1951 W. W. PAGET 2,547,169

PRESSURE PROVIDING DEVICE

Original Filed April 9, 1943 11 Sheets-Sheet 3

Inventor:
Win W. Paget.
by Louis A. Maxson,
Atty.

April 3, 1951 W. W. PAGET 2,547,169

PRESSURE PROVIDING DEVICE

Original Filed April 9, 1943 11 Sheets-Sheet 4

Inventor.
Win W. Paget.
by Louis A. Maxson.
Att'y.

PRESSURE PROVIDING DEVICE

Original Filed April 9, 1943

Inventor.
Win W. Paget
by Louis A. Maxson
Atty.

Inventor:
Win W. Paget.
by Louis A. Maxson
Att'y.

April 3, 1951 W. W. PAGET 2,547,169
PRESSURE PROVIDING DEVICE
Original Filed April 9, 1943 11 Sheets-Sheet 7

Inventor:
Win W. Paget.
by Louis A. Maxson,
Att'y

Inventor:
Win W. Paget.
by Louis A. Maxson
Att'y.

April 3, 1951 W. W. PAGET 2,547,169

PRESSURE PROVIDING DEVICE

Original Filed April 9, 1943 11 Sheets-Sheet 9

Inventor:
Win W. Paget.
by Louis A. Maxson.
Atty.

Inventor:
Win W. Paget.
by Louis A. Maxson,
Atty.

PRESSURE PROVIDING DEVICE

Original Filed April 9, 1943 11 Sheets-Sheet 11

Inventor:
Win W. Paget.
by Louis A. Maxson.
Atty

Patented Apr. 3, 1951

2,547,169

UNITED STATES PATENT OFFICE 2,547,169

PRESSURE PROVIDING DEVICE

Wm. W. Paget, Michigan City, Ind., assignor to Joy Manufacturing Company, a corporation of Pennsylvania Original application April 9, 1943, Serial No. 482,422. Divided and this application November 23, 1944, Serial No. 564,854

15 Claims. (Cl. 230—26)

My invention relates to air compressors, and more particularly to multi-stage air compressors which are especially adapted to, but in no sense limited to, use in cabin pressurizing systems of aircraft.

In the operation of aircraft at high altitudes it is necessary to provide for higher compression ratios than are practicable with single stage centrifugal type superchargers, and it is further desirable, in view of flight at different altitudes, to provide for multi-stage operation under some circumstances but to be able to dispense with this under conditions of flight at lower altitudes. It is further desirable to provide for the automatic control of the shift from one mode of operation to another under control of mechanism responsive to ambient pressures. It is still further desirable to make provision for the unloading of the first stage of a multi-stage compressor and to make provision for permitting the second stage selectively to take fluid from the same sources from which the first stage takes fluid or from the discharge of the first stage, and to provide controlling means for the suitable governing of the unloading device and of the means for changing the point from which the second stage takes fluid.

It is an object of my invention to provide an improved cabin pressurizing pressure providing device. It is another object of my invention to provide an improved multi-stage cabin pressurizing device. It is a further object of my invention to provide an improved gaseous fluid compressor. It is still another object of my invention to provide a plural stage supercharging device in which regulation of the intake pressure of the second stage is effected by means of a bypass valve variably distributing air from the first stage discharge between the second stage intake and a return line to the atmosphere, said valve being governed automatically by the rate of flow from the second stage discharge. It is still another object of my invention to provide an improved multi-stage supercharger having the intakes of its plurality of stages so related and controlled that the high pressure stage may readily have its intake connected with the source of supply of air to the intake of the lower pressure stage or with the discharge of the lower pressure stage. It is yet a further object of my invention to provide an improved plural stage compressor having an unloading device associated with its first stage and valve means associated with its second stage for selectively connecting the intake of the latter stage with the same source from which the first stage takes fluid or with the discharge of the first stage, and having altitude responsive means for controlling the unloading device and the valve means. It is still another object of the invention to provide a plural stage rotary compressor having valve means associated with the intake of its second stage permitting selective connection of said intake either with the source of supply of air to the intake of the first stage or with the discharge of the first stage, and altitude responsive means for controlling said valve means. Other objects and advantages of the invention will hereinafter more fully appear.

In the accompanying drawings, in which for purposes of illustration one embodiment of my invention is shown together with a fragmentary showing of a portion of a system with which the invention finds advantageous use, Fig. 1 is a generally diagrammatic view showing the multi-stage supercharger in elevation, said supercharger constructed in accordance with the illustrative embodiment of the invention, and a portion of the system for cabin pressurizing to the extent necessary to show the flow of air with respect to the supercharger.

Figures 1, 2:
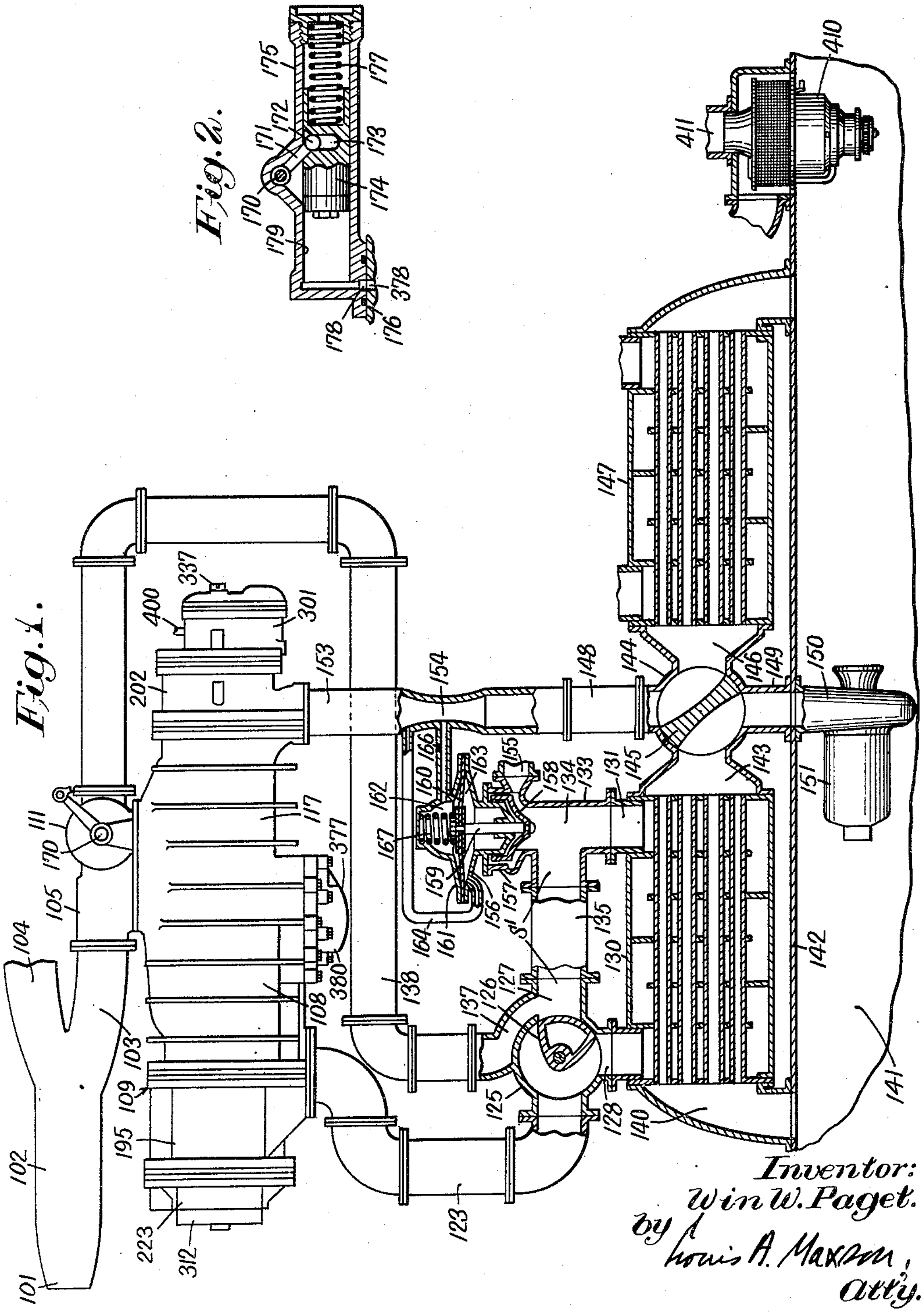
Fig. 2 is a fragmentary sectional view showing the operating mechanism for the valve device which varies the connection of the intake to the high pressure stage with respect to the source from which it takes air.
Figure 3:
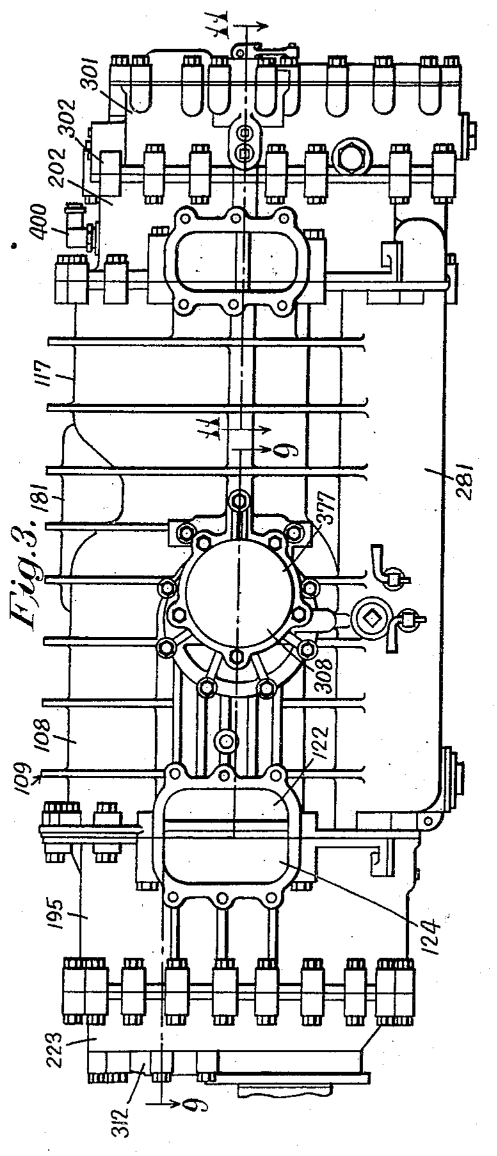
Fig. 3 is a side elevational view of the improved multi-stage supercharger.
Figure 5:
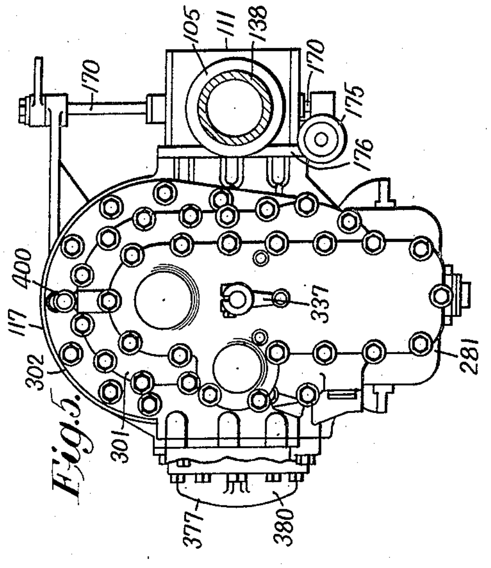
Fig. 5 is an end elevational view showing the opposite end of the supercharger shown in Fig. 3.

Referring first to Fig. 1, it will be observed that a rammed inlet 101 arranged, for example, at the lead edge of an aircraft wing (not shown) communicates through a passage 102 with the branch conduits 103 and 104. With the latter conduit we shall have no further concern in this application. The conduit 103 communicates, as shown herein (see Fig. 9), with a fitting 105 which has an opening 106 communicating with the intake space 107 of the first or primary stage 108 of a multi-stage supercharger, herein generally designated 109. The fitting 105 also has formed integral therewith a valve receiving portion 111 within a bore 112 of which a valve 113 is rotatably mounted. This valve 113 has a right angle passage 114 therein and is adapted in different positions thereof to connect the opening 115, at the opposite end of the fitting 105 from the conduit 103, with the intake 116 of the second stage 117 of the multi-stage supercharger 109. In a different position of the valve 113 (turned 90° clockwise from the position of Fig. 9) the passage 114 of said valve connects the space within the fitting 105, at the end of the latter connected to the conduit 103, directly with the intake 116 to the second stage 117 of the supercharger.

The low pressure or primary stage 108 of the supercharger 109 will be described in more detail later, but it may be noted that this stage is provided with an unloading valve 120 which is governed by external pressures (pressures external to the aircraft) by means later to be described, and that a connection 121 from the outlet side of the unloading valve 120 communicates at 122 with a conduit 123, which is connected with and leads from the main discharge opening 124 of the low pressure stage 108 and constitutes a discharge line for the latter. The conduit 123 leads to a valve casing 125 in which there is rotatably mounted a valve 126 which distributes the flow of air from the conduit 123 to one or the other, or in part to each, of spaces 127 and 128.

The space 128 is connected with the intake or left hand end of the outer course of a heat exchanger 130, herein shown as of a conventional shell, tube and baffle type. The other or discharge end of the heat exchanger 130 connects at 131 to a fitting 133 whose interior space 134 is connected by a tubular conduit 135 with the space 127. The space 127, the interior of the conduit 135, and the space 134 may conveniently be considered for certain purposes as space $S^1$. The space $S^1$, and specifically the space 127, is connected by a passage 137 in the valve casing 125 with a conduit 138 which connects with the opening 115 in the fitting 105. It will therefore be evident that the second stage 117 of the supercharger takes its air during compound operation from the space 127.

The inner course of the heat exchanger 130 is connected at its left hand end by a passage 140 with the interior space 141 of the airplane cabin 142. The other end of the inner course of heat exchanger 130 is connected, as at 143, to a valve casing 144 in which there is rotatably mounted a valve member 145 which is adapted to connect the connection 143, and a diametrically opposite connection 146 associated with another heat exchanger 147 selectively with a conduit 148 or a conduit 149, the last two conduits being diametrically opposite each other with respect to the valve casing 144, and the conduit 148 constituting a portion of the discharge conduit or line for the second stage 117 of the supercharger, and the conduit 149 being connected to the discharge volute 150 of a suitably motor driven air circulator 151 arranged within the cabin space 141. The conduit 148 is connected by means of a conduit 153 containing a venturi 154, with the discharge from the second stage of the supercharger 109.

The space 134 is connectible with an atmospheric vent 155 through an automatically controlled vent-governing valve device 156. This valve device comprises a casing 157 in which a substantially balanced valve 158 is reciprocable. A valve stem 159 connects the valve with a diaphragm 160 which divides a chamber-forming housing 161 into two spaces 162 and 163. The space 163 is at the side of the diaphragm 160 towards the valve 158 and is connected by a conduit 164 with the end of the venturi towards the supercharger high pressure stage discharge, i. e. the entrance or inlet end of the venturi. The chamber 162 is connected by a conduit 166 with the throat of the venturi. A suitable spring 167 acts upon the upper side of the diaphragm to bias the valve 158 towards closed position. When the mass flow of air through the venturi is large, the pressure differential at opposite sides of the diaphragm 160 is such as to open the valve 158 and vent more air to the atmosphere. When the mass flow is less, the pressure differential falls and the valve 158 closes to a greater extent. Thus this valve tends to maintain a relatively uniform mass flow of air through the conduit 148 during compound operation of the supercharger since it cuts down the air delivered to the intake of the second stage 117 of the supercharger when the latter delivers more air.

It is unnecessary to describe the controls of the valves 126 and 145 for the purposes of this case, or any further portions of the general system of which a part has been described. The valve 113 has an operating shaft 170. This operating shaft has, as shown in Fig. 2, an arm 171 fixed thereto, and the arm carries a rounded head 172 received in a slot 173 formed in a piston 174 which is reciprocable in a cylinder 175. This cylinder is suitably mounted upon any suitable support 176 adjacent the valve casing 111, herein upon a portion of the casing of the supercharger 109. A spring 177 normally tends to maintain the piston 174 in a position at the left hand end of its cylinder 175 in Fig. 2, and the arm 171 in a position at right angles to the position shown in Fig. 2. Accordingly, the valve 113 will normally be held in a position at 90° clockwise from the position shown in Fig. 9, unless the piston 174 is moved by fluid to the position shown in Fig. 2.

When the control for the valve 120 is described, there will be explained an automatic, external-pressure-responsive control for hydraulic pressure produced by the operation of a pump driven with the supercharger, and it will suffice for the moment to state that upon the attainment of the aircraft to a preselected level, a portion of the hydraulic pressure then established will be delivered through a port 178 into the bore 179 of the cylinder 175, and this pressure will act upon the piston 174 and move the valve 113 to the position shown in Fig. 9.

The specific structure of the supercharger 109 may now be described, but it will be understood that superchargers of other types may be employed, and also different superchargers of the intermeshing rotor type, as for example those having rotors with lobes and grooves of the generated surface type. Now referring to the figures relating more particularly to the disclosure of the supercharger, it will be noted that I have shown, as highly efficient for use in a system of the character which has been so far described briefly, and as especially adapted to the accomplishment of the objects of my invention, the supercharger 109 as consisting, in each stage thereof, of a pair of coacting rotors having special lobe and groove forms later described. As previously noted, this supercharger comprises the low pressure stage 108 and the high pressure stage 117, and the supercharger also comprises a casing 181. This casing is divided into a high pressure section and a low pressure section by a partition 182, which comprises a relatively thin portion 183, where the sides of the partition are recessed to provide intake grooves, and a thicker portion 184, where the full width of the partition is desired in order that space packings may be provided at the ends of the rotors. The casing has an internal enlargement at 185 at the intake end of the low pressure stage and a somewhat similar internal enlargement, as at 186, for the high pressure stage. These enlargements provide intake spaces of more convenient form. The partition 182 is traversed by two bores 187 which provide seals for a pair of rotor shafts 188 and 189 respectively. Each of these rotor shafts, as above noted, carries a pair of rotors. A low pressure or first stage rotor 190 having peripheral lobes 191 is mounted on the shaft 188 nearer the driven end of the latter. A coacting peripherally grooved rotor 192 having grooves 193 to coact with and receive the lobes 191 is mounted on the corresponding end of the shaft 189. These rotors are held in any suitable manner to their respective shafts, and they are of such lengths as substantially completely to fill the space from the wider portion of the intermediate partition 182 to the chamber end plate 194 which is formed integral with a housing member 195 containing portions of the driving mechanism. For a substantial portion of its interior the walls of the casing 181 are a close, space-packing fit, as at 196, for the first stage rotors; the casing, where this space packing relation with the rotors is maintained, being generally of the form resulting from the overlapping, for a relatively small portion of their circumferences, of two cylinders. Other, high pressure stage rotors 197 and 198 are arranged near the opposite ends of the shafts 188 and 189, the lobed rotor 197 which has lobes 199 upon it being arranged on the shaft 188 and the grooved rotor 198 having grooves 200 being arranged on the shaft 189, the length of the rotors 197 and 198 being such as substantially completely to fill the space between the partition 182 and an end plate 201, which is herein shown as formed integral with a housing element 202 of a composite head at the opposite end of the casing 181 from the driving mechanism housing 195. The lobes and grooves are helically disposed, and the rotors each have herein four lobes in the case of the lobed rotors and herein six grooves in the case of the grooved rotors. The lobes and grooves are herein shown as shaped at the leading sides thereof with substantially arcuate surfaces while the receding sides correspond to generated surfaces, these generated surfaces on the lobes generated by edges on the grooved rotors, and these generated surfaces on the grooved rotors generated by the outermost edge lines of the lobes on the other rotors. The helices of the lobes and grooves are of opposite hand in the different stages and the high pressure stage has its spiral angle smaller than the spiral angle of the low pressure rotors in the construction illustrated, so that the overall length of the high pressure rotors is somewhat less. Moreover, as will be apparent from Figs. 31, 32, 33 and 34, while the arcuate extent of the intake passages 203 and 204 of the low and high pressure stages respectively is essentially the same, the angular extent of the discharge opening 205 of the low pressure stage is substantially greater than the angular extent of the high pressure discharge opening 206, so that there is an additional feature contributing to the obtaining of substantially the same range of compression in the two stages, notwithstanding that one stage is longer, lengthwise of the supercharger, than the other.

As previously explained, rotors having their lobes and grooves formed with generated surfaces in a well known manner may be substituted for the rotors described, without departing from the invention in its broader aspects in any way.

The rotors shown are designed to operate with "space packing" with respect to each other as well as with respect to the casing; and, because of the length of the shafts 188 and 189, pairs of timing gears are provided near each end of the shafts, the timing gears at the driving end of the shafts being numbered 207 and 208, these timing gears being fixed to the shafts with which they are coaxial. The shaft 188 has a stub shaft 211 at its driving end. The space packing between the high pressure stage rotors 197 and 198 is maintained by rigidly fixing the high pressure (discharge) ends of these rotors to sleeves 213 and 214 which carry timing gears 209 and 210. The sleeve 213 is rigidly connected to the shaft 188, as by pins 215 which connect the lobed rotor to the sleeve 213.

The extent of the intake port 203, from the functional aspect, is, with the proportion shown, such that the trailing edges of the grooves 193 and the spaces between the lobes 191 pass out of register with the intake port just before engagement or the start of compression within the tooth grooves and spaces begins. However, if a small amount of overlapping, so to speak, were to be desired, this would be permissible in view of the dynamic effect of the incoming air, which is sufficient to offset the tendency towards the reversal of flow caused by the initial compression.

The fluid which is "sealed" in the successive progressively diminishing chambers between the rotors and the casing walls is substantially compressed when the valve 120 is closed and there is no escape or discharge from the pockets in the rotors between the time when pairs of tooth spaces or grooves move out of communication with the intake and the instant that the leading edges of the cooperating spaces and grooves come into communication with the discharge 124. However, the valve 120 is so positioned, and a port 216 which this valve controls is so positioned, that, with the proportions heretofore explained, tooth pockets whose trailing edges are just ceasing to communicate with the intake are just about to commence to have their forward edges pass the edges of the opening 216 and establish communication with the latter; and as the trailing edges or tooth pockets approach their points of final communication with the opening 216, when the latter is open, they have their leading edges pass beyond the edge of the final discharge opening, whereby there is displacement, but not compression in sealed pockets, of fluid when the opening 216 is not closed by the valve 120. When the valve 120 is closed, the ratio of compression in the two stages of the compressor is desirably, but not necessarily, approximately the same. Ratios of compression in each stage of between two and three to one are satisfactory for conditions often encountered; but in no sense should these values be regarded as limiting. For purposes of reference, the discharge 124 for the low pressure stage may be considered as an intermediate discharge for the supercharger while the discharge 153 for the high pressure stage may be considered as a terminal discharge.

The supercharger may be driven in any suitable manner, as by a shaft 219 which may desirably be driven through a flexible non-backlash drive such as, for example, is disclosed in my application Serial No. 443,414, filed May 18, 1942, now abandoned; and this shaft 219 is arranged in alinement with the rotor shaft 189 and is adapted to be connected to drive the latter by means of a drive shaft 220 with which it has a splined driving connection, as shown at 221. The drive shaft 220 is journaled in a ball bearing 222 carried by a plural-part head 223 supported by and fixed to the housing 195. Surrounding a cylindrical hub portion 224 of the gear 208 is a bearing sleeve 225, and a cylindrical portion 226 at the right hand end of the drive shaft 220 rotatably surrounds the bearing sleeve and is journaled thereon. Keyed to the drive shaft is a member 227 having a number of recesses 228 formed therein receiving rollers 229 adapted, under proper circumstances, to clutch the member 227 to a cylindrically bored liner ring 231 keyed, as at 232, to the gear 208. The recesses 228 have relatively straight base surfaces 235 and radial surfaces 236. Through the latter surfaces project spring pressed plungers 237 adapted to act upon the rollers 229 and cause them to connect the members 227 and 231 on predetermined relative rotation between the latter members. Springs 238 act against cross pins 239 and move the plungers 237 against the rollers 229. The pins are supported in end-closure plate members 242 and 243, and the rollers have stems 244 loosely received in openings 245 in the plates 242 and 243. The plates 242 and 243 are supported to turn with the member 227. It will be noted, referring to Figs. 27 and 28, that if the member 227 be driven counterclockwise, it will be connected by the rollers 229 to the liner ring 231 and, through the latter, drive the gear 208; and, by virtue of the connection of the gear 208 to the shaft 189, drive the rotor 192, while, through the meshing of gear 208 with gear 207 and the mounting of gear 207 on shaft 188, the rotor 190 will also be driven. If the gear 208 be driven counterclockwise at a greater angular rate than the member 227 it will not be connected to that member but may turn freely in the direction mentioned relative to it.

Figure 6:
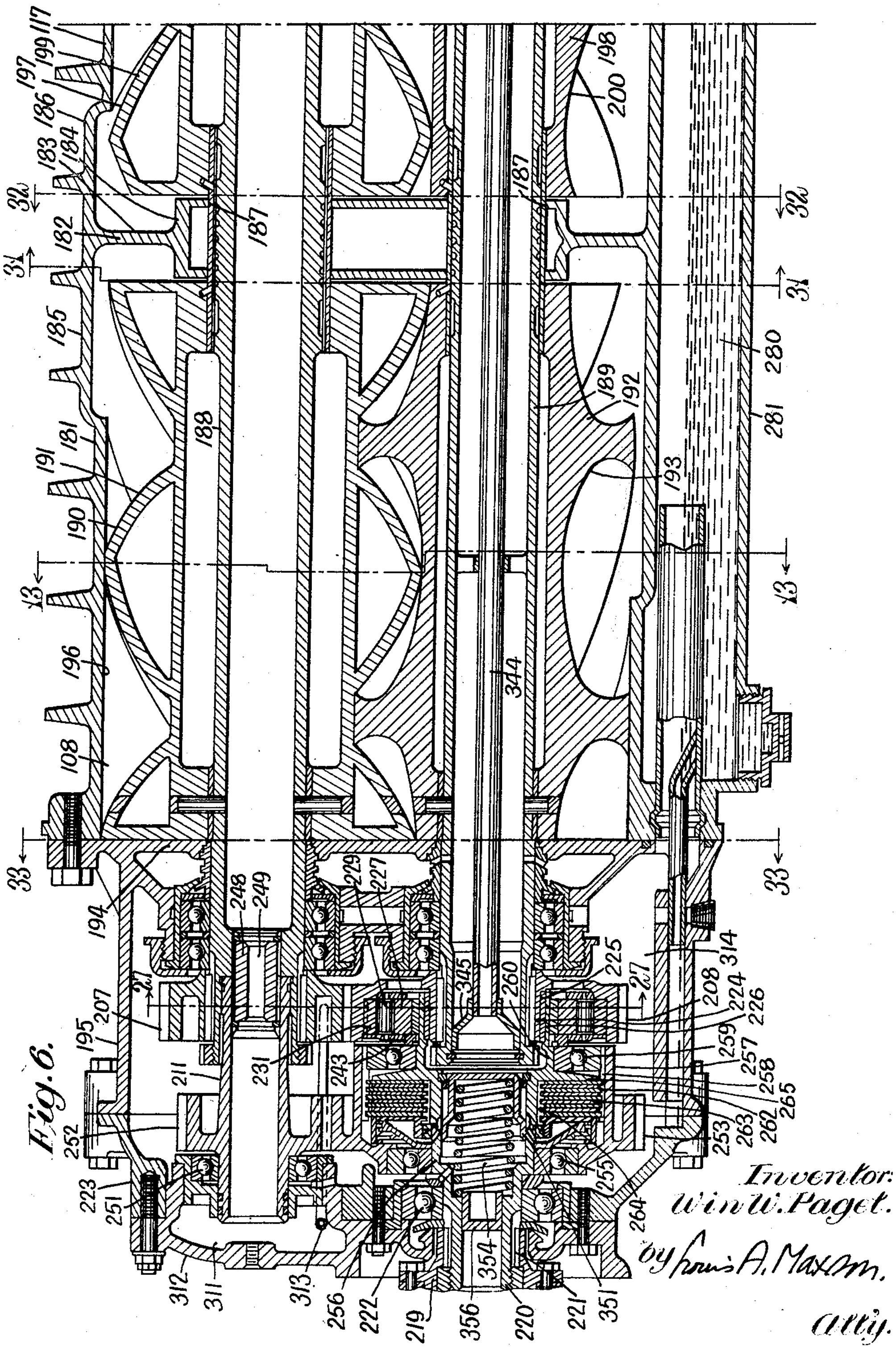
Fig. 6 is an enlarged, partial, central longitudinal vertical section on the plane of the line 6—6 of Fig. 4, showing the low pressure stage of the supercharger of Fig. 3 and the drive for said supercharger and a portion of the high pressure stage.
Figures 26, 27, 28, 29, 30:
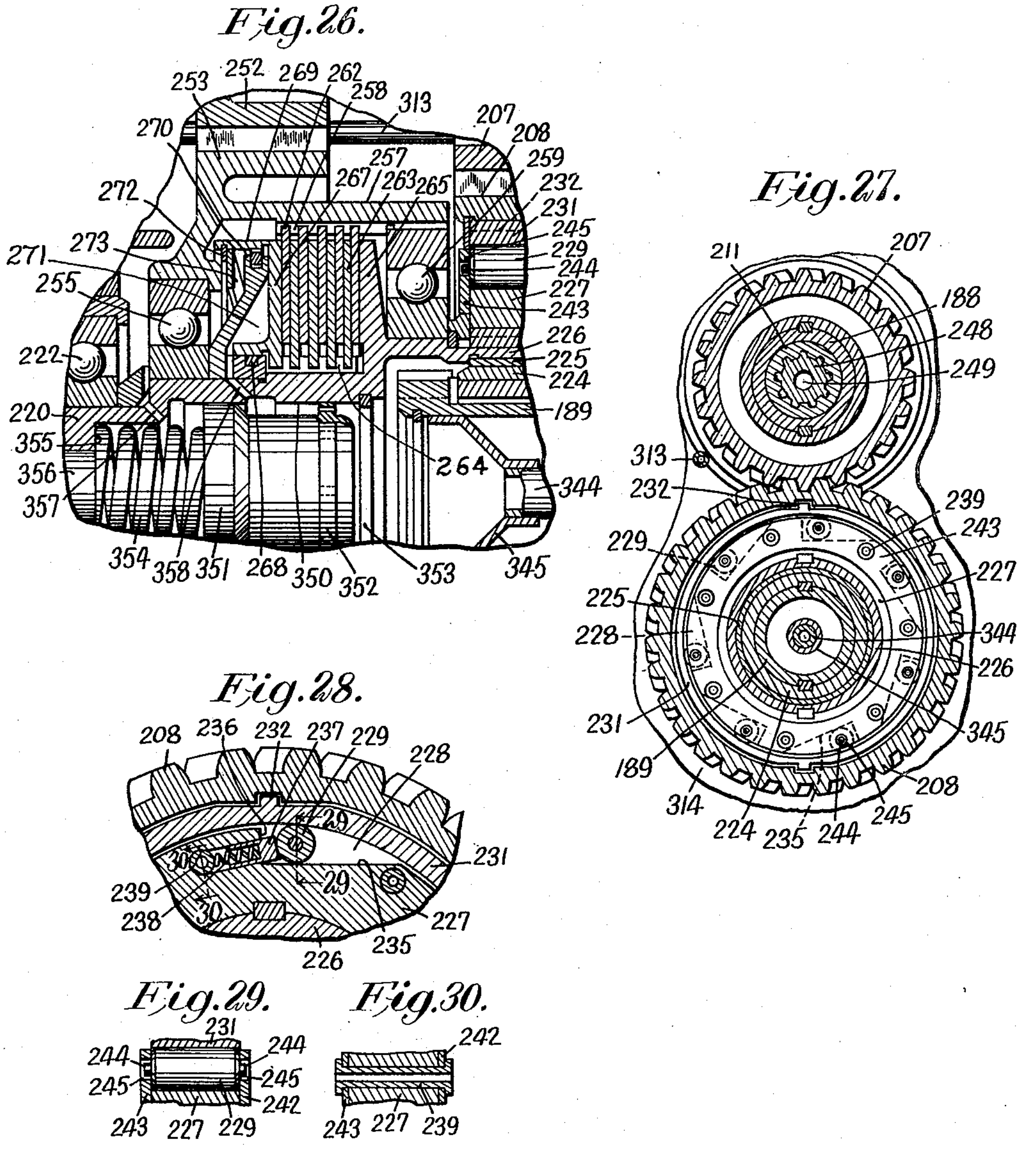
Fig. 26 is an enlarged fragmentary sectional view on the plane of Fig. 6, showing details of the speed controlling drive clutch.
Fig. 27 is a vertical sectional view on the plane of the line 27—27 of Fig. 6, showing a portion of the driving gearing.
Fig. 28 is an enlarged transverse fragmentary sectional view showing a detail of the drive mechanism.
Fig. 29 is a fragmentary section on the plane of the line 29—29 of Fig. 28, showing a detail of a roller ratchet.
Fig. 30 is a section on the line 30—30 of Fig. 28, showing another detail of the roller ratchet.
Figures 31, 32:
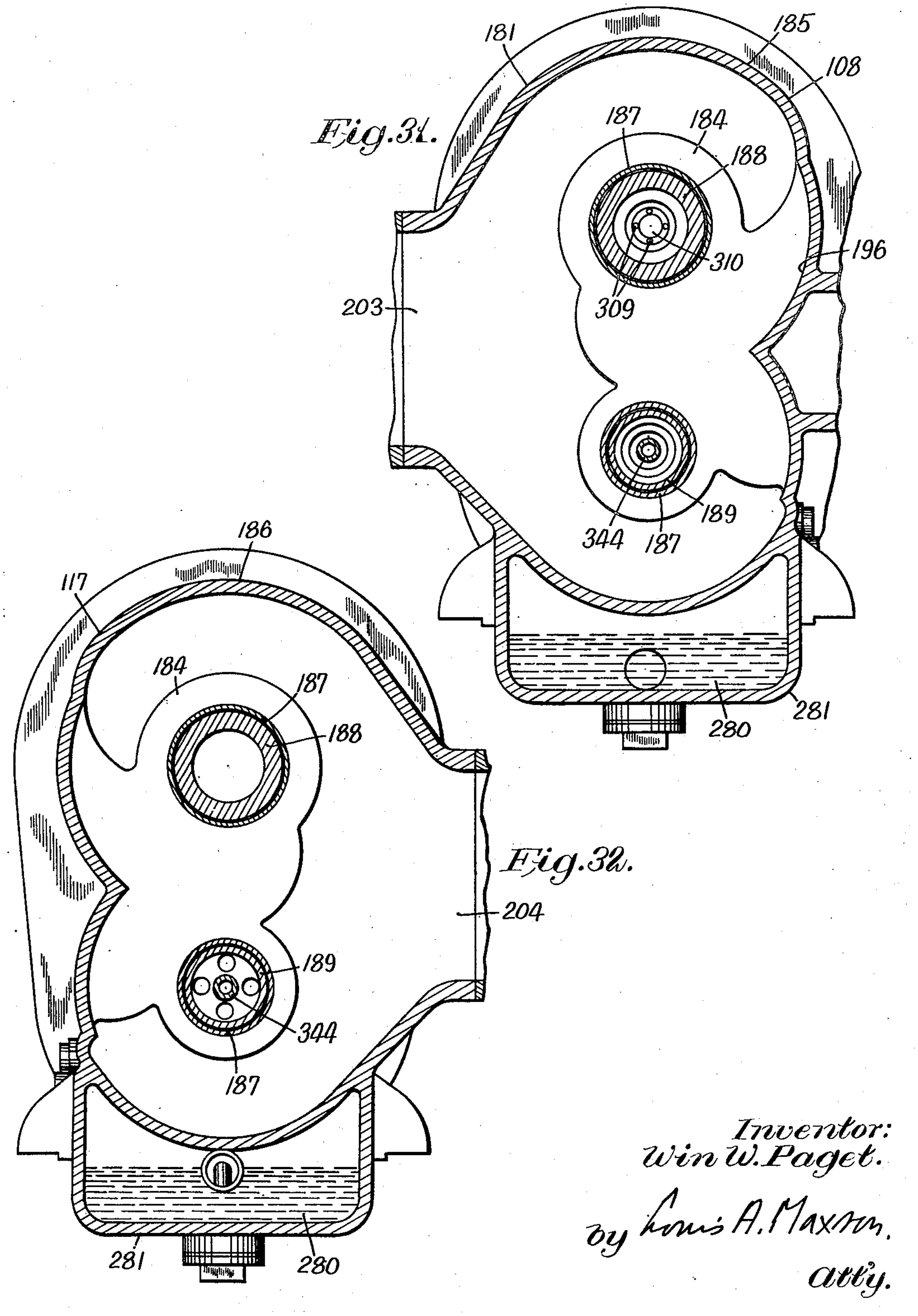
Fig. 31 is a vertical section on the plane of the line 31—31 of Fig. 6, showing the passage arrangement at the intake end of the low pressure stage of the supercharger.
Fig. 32 is a vertical section on the plane of the line 32—32 of Fig. 6, showing the passage arrangement at the intake end of the high pressure stage of the supercharger.
Figures 33, 34:
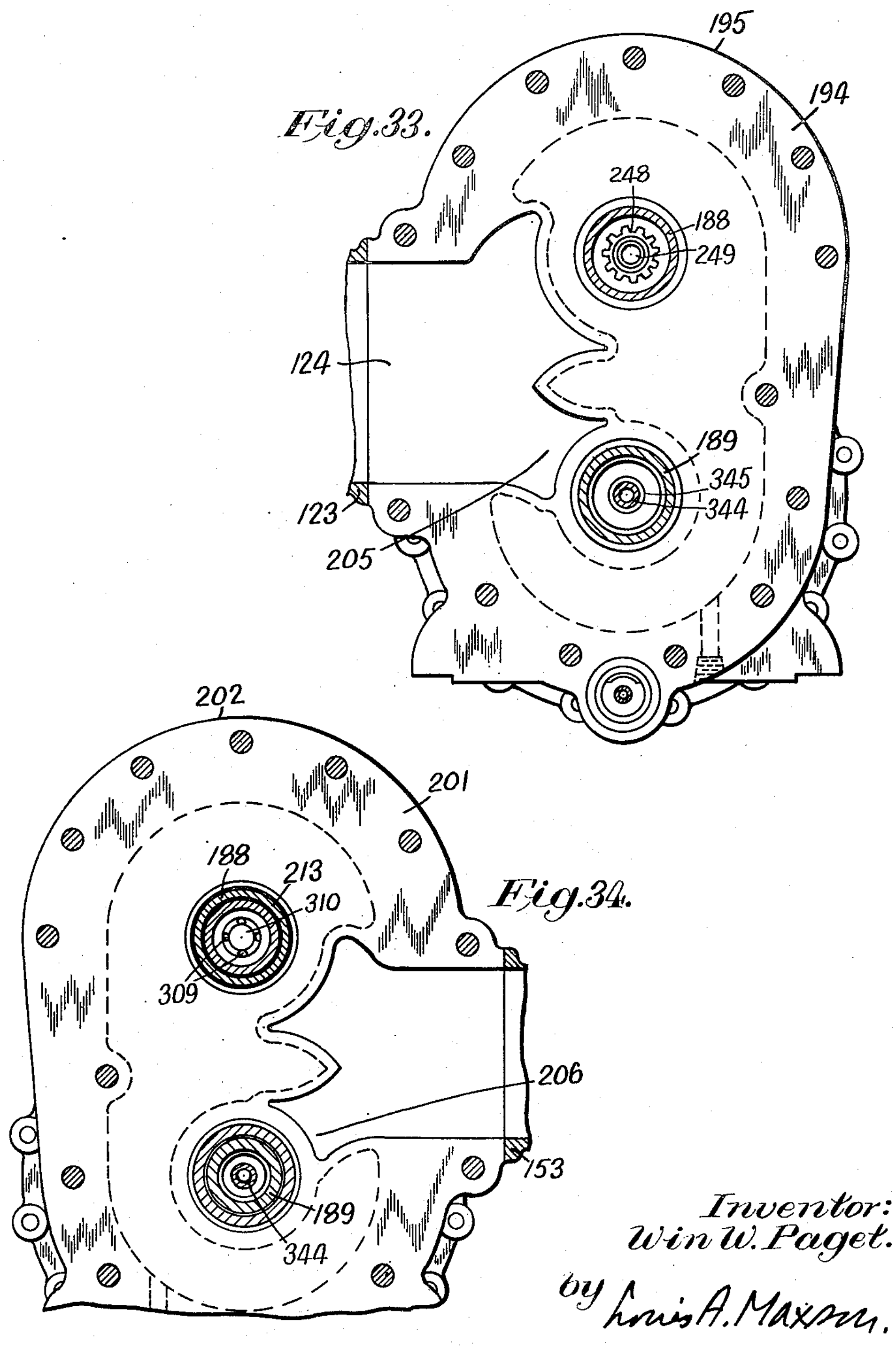
Fig. 33 is a vertical section on the plane of the line 33—33 of Fig. 6, showing the passage arrangement at the discharge end of the low pressure stage of the supercharger.
Fig. 34 is a vertical section on the plane of the line 34—34 of Fig. 7, showing the passage arrangement at the discharge end of the high pressure stage of the supercharger.

The shaft 188 has another shaft 211 connected with it. It will be noted that the shaft 211 is connected by means of a splined connector element 248 with the shaft 188. This connector element is hollow from end to end, as at 249. The left hand end of the shaft 211, as viewed in Fig. 6, is journaled in a ball bearing 251 carried by the plural-part head 223 and carries a gear 252 somewhat smaller than the gear 207. A gear 253, somewhat larger than the gear 208, meshes with the gear 252 and is journaled by a ball bearing 255 on a cylindrical portion 256 of the drive shaft 220. The gear 253 also has a sleeve portion 257 internally splined at 258 and supported by a ball bearing 259 on a further cylindrical portion 260 of the drive shaft 220. Discs 262 connected to the sleeve portion 257 are interleaved with other discs 263 connected by splines 264 to the drive shaft 220 which has a flange 265 adjacent the bearing 259 serving as an abutment for the end one of the interleaved series of discs 262 and 263 when these are pressed together to connect the gear 253 to the drive shaft 220. A follower member 267, as shown in Fig. 26, is slidably supported on a packing ring 268 mounted on the shaft 220, and has an annular outer sleeve portion 269 with whose bore a peripherally packed plate 270 coacts to form a chamber 271 for the clutch applying hydraulic pressure. A ring 272 seated in an internal groove in the sleeve portion 269 provides an abutment for a flexed annular spring 273 whose opposite side presses upon the side of the plate 270, and the spring 273 normally maintains the follower member 267 in clutch unloading position.

When the clutch is loaded the gear 253 will be connected directly to the shaft 220 and will drive the gear 252 and so the gears 207 and 208, and thus the rotors 190 and 192; and because the gear 208 will then be rotated faster than the member 227 and in the same direction with the latter, there will simply be an overruning clutch action and no tendency for connection between gear 208 and member 227.

Figure 4:
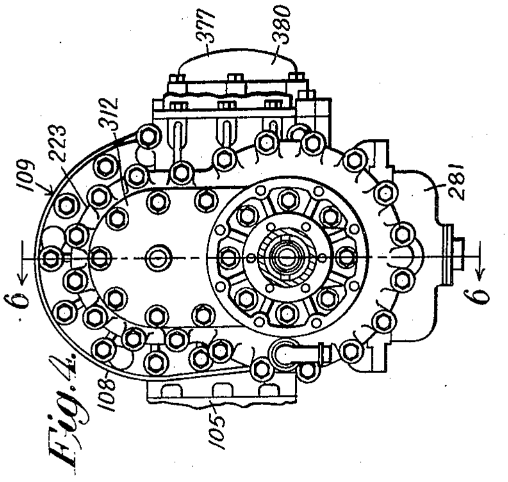
Fig. 4 is an end elevational view of the driving end of the supercharger shown in Fig. 3.

When the drive shaft 220 is rotated counterclockwise in Fig. 4 and the female rotors 192 and 193 turn in the corresponding direction while the male rotors turn in the opposite direction, air taken in through the intake connection to the low pressure stage will be entrapped between the casing and the rotors and be progressively moved, and, if it remains entrapped, be compressed as it is moved to the discharge connection 124, while air entering the high pressure rotors through the intake 116 will also be compressed as it is moved, in the opposite direction longitudinally of the shafts 188 and 189, to the discharge connection for the high pressure stage.

Hydraulic means having a common operating fluid are provided respectively for effecting an automatic change in the driving rate of the rotors upon predetermined changes in the speed of operation of the supercharger and for controlling the position of the valve 120 upon predetermined changes in external pressure.

Figure 7:
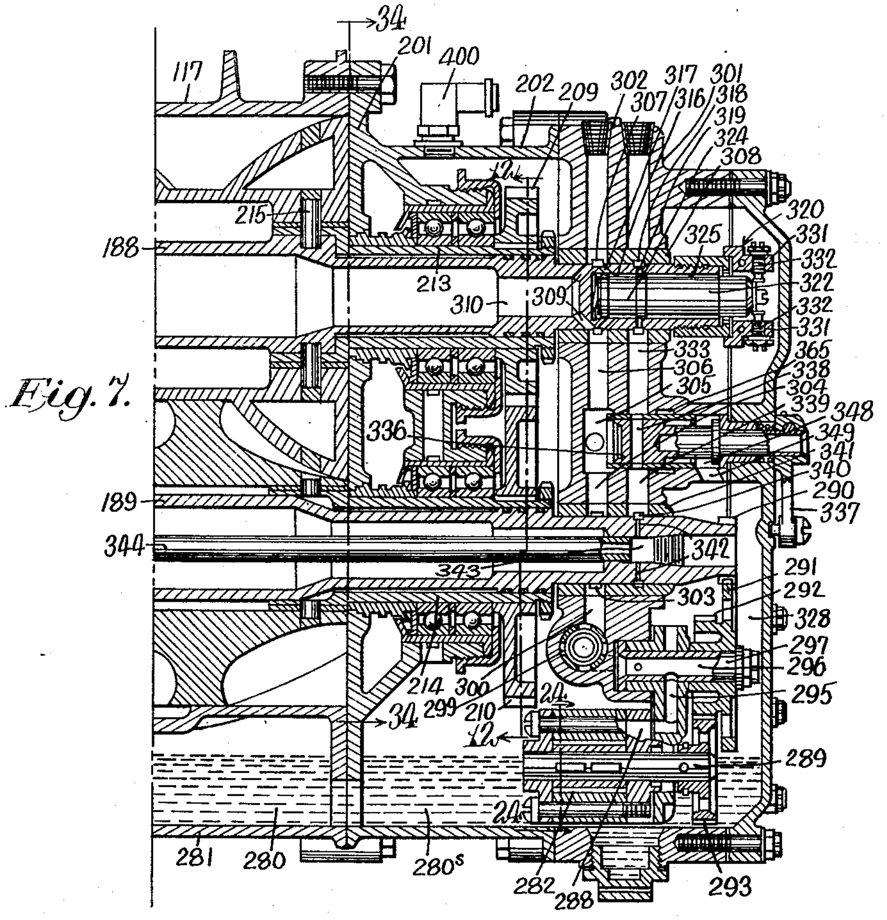
Fig. 7 is a view on the same plane as Fig. 6, showing the remainder of the high pressure end of the supercharger and portions of the control for the drive and for the unloading means for said supercharger, it being understood that Figs. 6 and 7 when taken together constitute an enlarged, full length section through the supercharger taken on the plane of the line 6—6 of Fig. 4.
Figure 8:
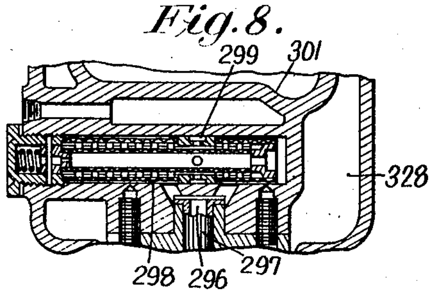
Fig. 8 is a fragmentary detail view showing details of the hydraulic circuit associated with the supercharger, and particularly the strainer portion thereof.
Figures 14, 15, 16, 17, 18, 19, 20, 21:
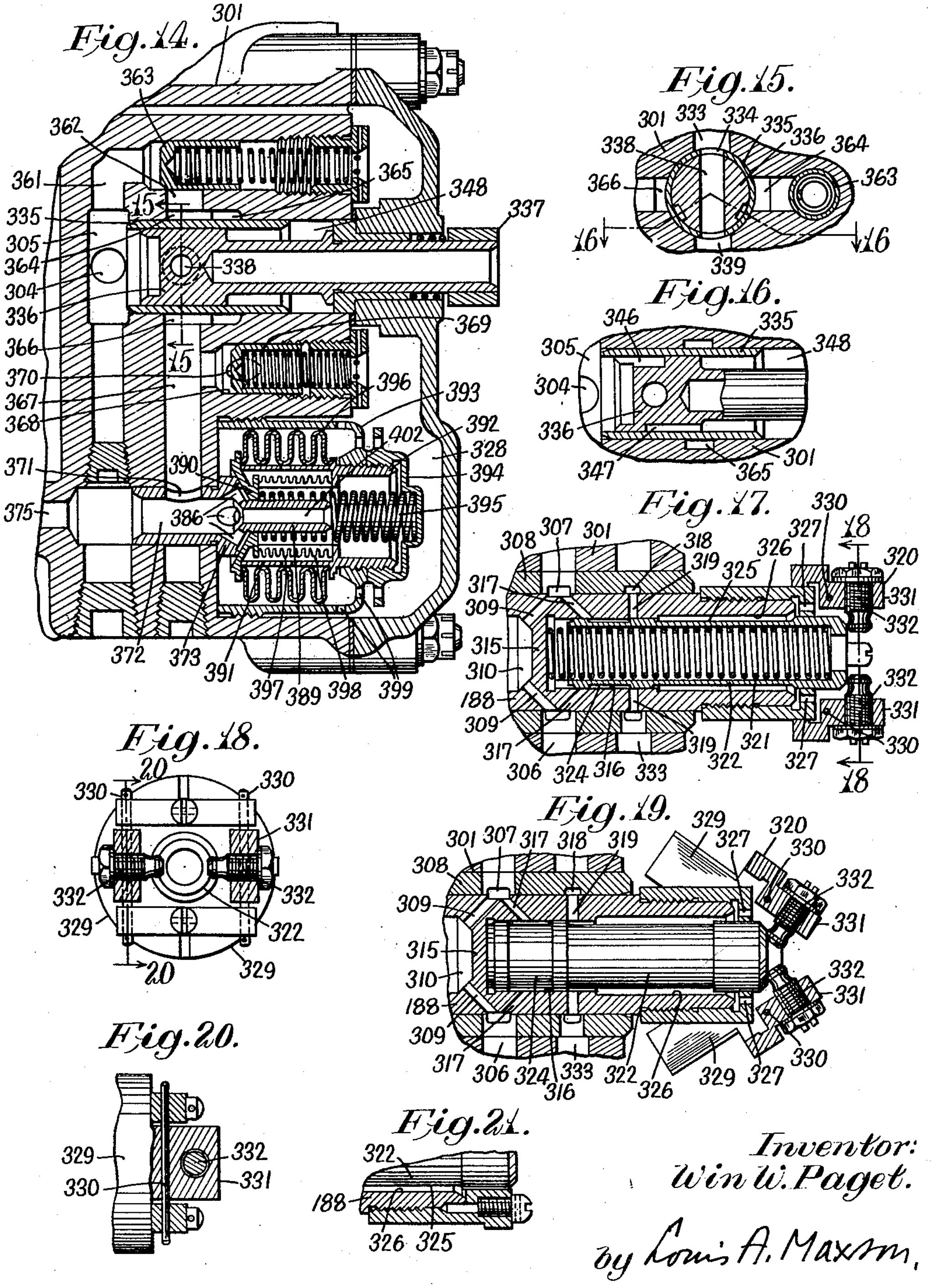
Fig. 14 is an enlarged horizontal sectional view through portions of the control mechanism at the right hand end of the supercharger, the view being taken on the same plane as Fig. 11.
Fig. 15 is a fragmentary vertical transverse section on the plane of the line 15—15 of Fig. 14, showing a manually operable control valve positionable to vary the speed of drive of the supercharger.
Fig. 16 is a section on the planes of the lines 16—16 of Fig. 15.
Fig. 17 is an enlarged detail sectional view on the axis of the speed responsive device for controlling the speed of drive of the supercharger.
Fig. 18 is a transverse vertical sectional view on the plane of the line 18—18 of Fig. 17.
Fig. 19 is a fragmentary view, generally similar to Fig. 17 but with parts shown in elevation, and illustrating a different position of the parts.
Fig. 20 is a detail longitudinal sectional view on the plane of the line 20—20 of Fig. 18.
Fig. 21 is a fragmentary detail view showing a locking screw for the governor.
Figures 22, 23, 24:
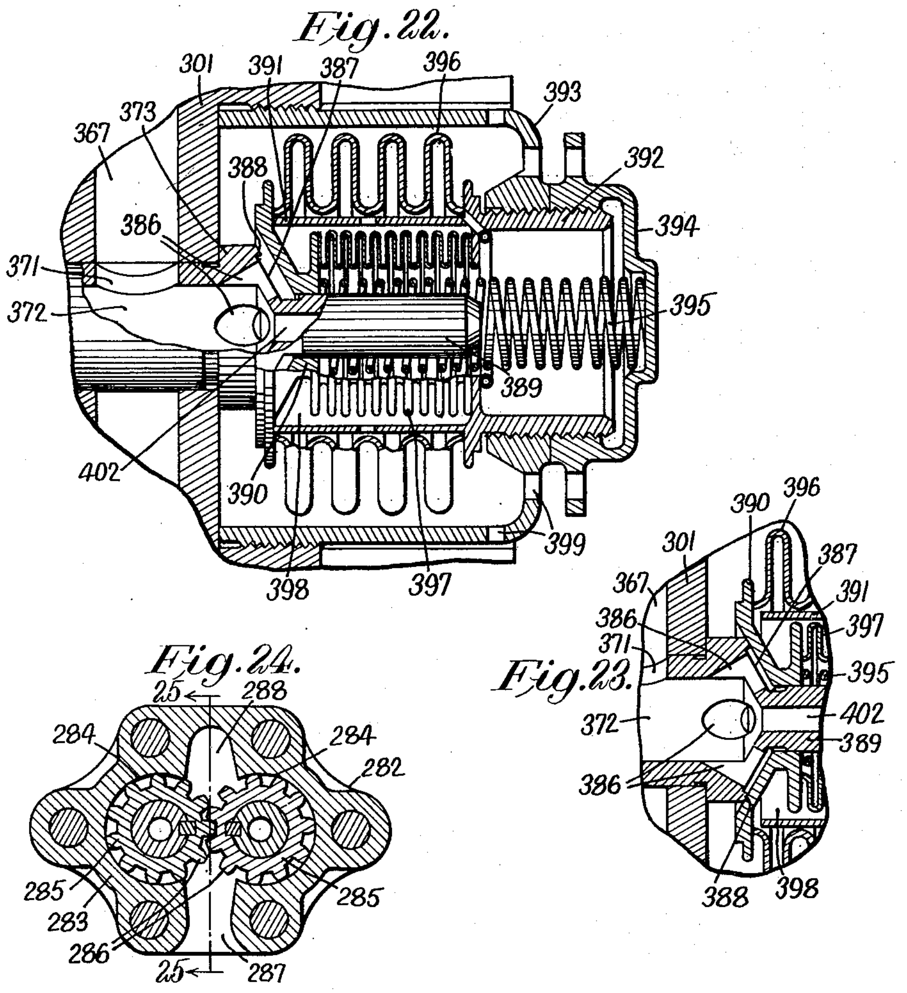
Fig. 22 is an enlarged horizontal sectional view on the same plane as Fig. 14, showing details of construction of the external-pressure-responsive unloader-valve-controlling pilot mechanism.
Fig. 23 is a fragmentary view on the same plane as Fig. 22, showing the parts in different relative positions.
Fig. 24 is an enlarged transverse vertical section on the plane of the line 24—24 of Fig. 7.
Figure 25:
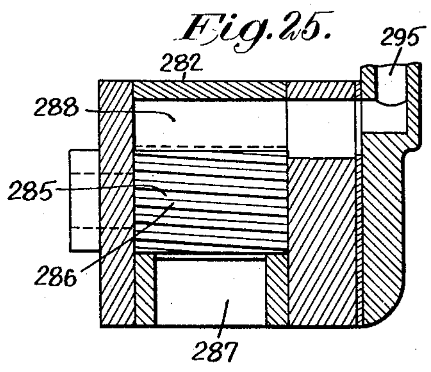
Fig. 25 is a longitudinal view on the line 25—25 of Fig. 24.

The base of the casing 181 contains a sump 280 between the lower wall of the rotor housing and an outer wall 281 forming an integral part of the casing 181. The sump 280 includes a portion 280s in the plural-part head 202 and is normally horizontal when the supercharger is horizontal. A pump 282 is positioned in the chamber 280s so that it is always partially submerged, and so that its intake is always submerged, in the horizontal position of the casing, in the oil in the sump. This pump, as shown in Fig. 24, includes a casing 283 having intersecting rotor chambers 284 therein in which are rotors 285 having intermeshing teeth 286 arranged at a slight angle to elements of a cylindrical surface in which the outermost points in the rotor teeth lie. An intake passage 287 conducts oil to the lower sides of the rotors 285, and this oil is carried around by the teeth 286 and is discharged to a discharge space 288 above the plane of the mesh line of the rotors 285. One of the rotors drives the other, and the first mentioned rotor is provided with a shaft 289, Fig. 7, which is driven through a train of gearing including a pinion 290 on the shaft 189, a gear 291 driven by the pinion 290 and driving a second pinion 292 herein shown as formed integral with and coaxial with the gear 291, the latter pinion engaging and driving a gear 293 secured to the shaft 289. The discharge passage 288 communicates with a passage 295 opening into a bore 296 in a sleeve member 297 and passes through a strainer device 298, and from the latter by way of an annular passage 299 to a vertically extending passage 300 in the element 301 of the composite head 302. Passage 300 opens into an annular groove 303 whose opposite side opens into a passage 304, whose upper end opens into a chamber 305. This chamber constitutes a distribution point for oil for lubricating purposes and for operating the speed-changing clutch mechanism previously described, and also for fluid for closing the valve 120. In line with the passage 304 there is another passage 306 opening upwardly from the chamber 305. This communicates with an annular groove 307 in a bushing 308 surrounding the shaft 188. This annular groove has continuously in communication with it obliquely disposed passages 309 opening into a chamber 310 which communicates with the hollow interior of the shaft 188 which delivers lubricant to and through the bore 249 of the connecting element 248 into the stub shaft 211 and through the latter into a chamber 311 formed in a head member 312 at the extreme left hand end of the supercharger as viewed in Figs. 6 and 7, from whence it is delivered through a suitable lubricant tube 313 to lubricate the gear couples previously described. After it is discharged over these gears, the lubricant passes downwardly into a chamber 314 and is conducted out of the casing back into the sump 280. As the lubricating arrangements for the driving gearing form no part of the subject matter specifically claimed in this application and correspond closely to those described in my copending application Serial No. 458,641, now Patent No. 2,477,003, July 26, 1949, further description at this point is unnecessary. The chamber 310 in the shaft 188 is separated by a partition 315 from a valve receiving bore 316. Passages 317, Fig. 17, connect the annular groove 307 with the bore 316 at points near the partition 315; and a further annular passage 318, formed in the bushing 308, is connected with the interior of the bore 316 by radial passages 319. The extreme right hand end of the shaft 188 supports a speed responsive governor 320 which serves, in conjunction with a spring 321 housed in the interior of a valve member 322, to vary the position of that valve member in the bore 316. This valve member is open from end to end, and the spring normally acts to thrust said valve towards the right in Fig. 17. The valve member 322 has a peripheral groove 324 adapted, in the position of the valve shown in Fig. 17, to connect the passages 317 and 319, and in the position shown in Fig. 19 simply to prevent any discharge of fluid through the passages 317. It has another and longer groove 325 which, in the position of Fig. 17, performs no function, but in the position of Fig. 19 connects the passages 319, through a slight annular enlargement 326 of the valve chamber, and ports 327 in the governor mounting, to a chamber 328 which communicates with the sump 280.

The governor includes fly weights 329 pivotally supported on transverse pins 330 in earlike portions 331 carried by the governor support. The weights carry adjustable screws 332 adapted to engage the right hand end of the valve member 322; and, upon the attainment of the shaft 188 to a predetermined speed of rotation, the fly weights effect a movement of the valve 322 from the position shown in Fig. 17 to that shown in Fig. 19. This, in a manner shortly to be explained, will effect a reduction in the speed of the rotors, but not a reduction sufficient to effect a changed operation of the speed governor permitting the valve 322 again to move to a position for supplying fluid in the manner shown in Fig. 17 from the passages 317 to the passages 319, since the design of the governor is such that it becomes operative to force the valve 322 to the left only upon the attainment of a speed of the order of 7000 R. P. M. while, after once assuming the position of Fig. 19, a falling off of the speed to a rate of the order of 4000 R. P. M. is necessary before the weights will move in and permit the reestablishment of fluid delivery in the manner to effect a change in operation of the driving gearing. Now, the groove 318 is connected at its lower side with a passage 333 which opens through an opening 334, Fig. 15, into the interior of the bore of a valve receiving bushing 335 in which there is a rotatable valve 336 which is adjustable by a handle 337. This valve, which is primarily used for testing purposes, normally occupies the position shown in Figs. 15 and 16, in which position a diametric passage 338 connects the opening 334 with a passage 339 and with an annular groove 340 provided in part in a bushing 341 surrounding the right hand end of the shaft 189 and in part in the periphery of that shaft. This annular groove is connected by radial ports 342 with a chamber 343 near the right hand end of the shaft 189; and a tube 344 extending axially of the shaft 189 leads to the left hand end of this shaft where it is centered by a suitable fitting 345.

Before describing the mechanism to which this tube delivers fluid, it may be pointed out that the valve member 322, at speeds of the shaft 188 below a predetermined number of R. P. M. will be in the position shown in Figs. 7 and 17, and will connect the pump discharge, via the ports and passages previously described, with the tube 344, but that at speeds above such a predetermined number of R. P. M. the valve member 322 will assume the position shown in Fig. 19 and cut off communication completely between the passages 317 and 319 and connect the latter passages, and so the interior of the tube 344, back to the sump through the chamber 328. It may be noted that the valve 336 may be turned at will either to provide a direct and continuous communication between the chamber 305 and the passage 339 through a groove 346 in the valve, or when oppositely turned from central position may effect a continuous venting of the passage 339 through another peripheral groove 347 to a space 348 communicating through a passage 349 with the chamber 328.

Within a stepped bore 350, Fig. 26, within the drive shaft 220 there is arranged a hollow plunger 351 which is provided at one end with a perforated flange 352 adapted to seat against a split ring 353 secured within the inner wall of the drive shaft 220. The plunger member 351 is engaged by a spring 354 which reacts against a shoulder 355 within the drive shaft, and a thimble 356 closes the left hand end of the chamber within which the element 351 is movable. The interior of the chamber communicates through obliquely radially extending passages 357 with the outside of the drive shaft between the ball bearings 222 and 255; and radially obliquely extending passages 358 connect the interior of the stepped bore 350 at the right hand end of the plunger member 351 in communication with the chamber in which the member 270 moves at the right hand side of that member.

The mode of operation of the mechanism described is as follows: When the compressor is started, a driving connection is immediately established between the shaft 220 and the gear 208, and the pump 282 commences to deliver fluid through the passage 295, the bore 296, the strainer 298, the annular passage 299, the passage 300, the annular groove 303, the passage 304, the chamber 305, the passage 306, the annular groove 307, the passages 317, the groove 324, the passages 319, the groove 318, the passages 333, 338 and 339, the annular groove 340, the radial passages 342, the chamber 343 and the tube 344, to the bore 350, where it will pass through the passages in the flange 352 and through the radial passages 358 and bring the clutch discs 262 and 263 into contact with each other. As the oil continues to pass through the tube 344, the member 351 moves to the left, compressing the spring 354, and the compression of this spring is so determined that the clutch pressure will be gradually applied as the member 351 moves to the left. When this member reaches its extreme left hand position, the clutch discs may be firmly pressed against each other, and there will be effected drive of the rotors at the higher speed, with the gear 253 as the driving element. This high speed drive will be continued until the speed of the compressor builds up to such a degree that the valve member 322 will be shifted by the governor and then the slow speed drive between the shaft 220 and the compressor will be initiated.

The control for the valve 120 and for the valve 113 may now be described. The chamber 305 has a laterally extending passage 361, Fig. 14, communicating with it. The communication of the passage 361 with a passage 362, which extends parallel to but oppositely with respect to the passage 361, is governed by a spring loaded valve 363. This spring loaded valve operates to maintain a sufficient pressure in the chamber 305 under all circumstances when the compressor is running to insure the operation of the speed change mechanism. Passage 362 opens through a longitudinal slot 364 into an annular chamber 365 surrounding the sleeve 335, and at the opposite side of said sleeve another longitudinally extending slot 366 connects the annular chamber 365 with a passage 367 which is alined with the passage 362. This last passage has a bore 368 communicating with it, and a valve 369 is reciprocable in this bore and controls a side vent 370 which is connected with the space 328. The valve 369 is suitably spring loaded and serves to regulate the pressure in the passage 367. Passage 367 communicates through a port 371 with the bore 372 of a valve seat member 373 which is connected by another passage 375 to a passage 376, Fig. 9, leading to a servo-motor 377 which is adapted to close the valve 120, and which passage 376 has a branch 378, Fig. 2, which leads to the port 178 for supplying fluid to the cylinder 175 to actuate the piston 174 and shift the position of the valve 113, which has been heretofore described. The servo-motor 377 comprises a cylinder 380 in which a piston 381 is reciprocable, said piston normally maintained in outer position by a spring 382 and connected by a stem 383 with the valve 120, which is mounted for swinging movement about a pivot mounting 384. It will be understood that if escape of fluid to the sump from the bore 372 be prevented, a supply of hydraulic pressure to the servo-motor 377 and to the cylinder 175 will take place sufficient to cause a movement of the piston 381 in the cylinder 380 in a manner to close the valve 120 and a movement of the piston 174 in the cylinder 175 in a manner to actuate the arm 171 to the position shown in Fig. 2 and move the valve 113 to the position shown in Fig. 9. Otherwise, the valve 120 will remain open and the valve 113 will remain in the position occupied at levels of the aircraft below 20,000 feet. To repeat, if escape of fluid from the bore 372 is interrupted, the valve 120 will be closed and the piston 174 will be moved at once to the position shown in Fig. 2.

To control the venting of pressure from the bore 372 back to the sump, and to maintain a free venting at heights below approximately 20,000 feet, and to interrupt venting sharply when approximately that elevation is attained, the following arrangement has been illustrated. The valve seat member 373 is provided with a plurality of ports 386, Fig. 22, opening through a surface 387 which provides an annular valve seat 388, and the member 373 has, in addition, a central guide extension 389. Slidably mounted upon this extension is a valve element 390. The movement of this valve element in an opening direction is limited by a sleeve portion 391 formed on a threaded sleeve member 392 which is supported by a further sleeve mounting element 393 carried by a wall of the housing element 301. An adjustable closure element and spring tension regulator 394 engages a spring 395 which acts upon the valve element 390 and normally tends to seat it. Connected to the valve 390 and to the sleeve member 392 at opposite sides of the sleeve portion 391 are bellows devices 396 and 397 bounding a chamber 398 in which the sleeve 391 is enclosed, and this sleeve is perforated so that free communication may at all times exist throughout the interior of the chamber 398. The chamber 398 is evacuated, and the compression of the spring 395 is so determined that until the pressure acting upon the exterior of the bellows arrangement falls to a predetermined low value, the valve 390 will be held firmly open against the stop sleeve 391. When, however, the pressure in the casing 393 falls below a predetermined value, the valve 390 will promptly seat and interrupt the discharge of fluid back to the sump and cause the building up of such a pressure in the bore 372 as to cause the valve 120 to close and the piston 174 to move to the position shown in Fig. 2 and shift the several valves which are controlled thereby. It will be noted that the walls of the casing 393 are perforated, as at 399, to permit the fluid passing from the passages 386 to flow freely back to the sump through the chamber 328. The chamber 328 is connected to external pressure—pressure outside the cabin—in any suitable manner, as through a connection shown in part at 400. The setting of the spring 395 is such that the valve 390 is normally open at heights of the aircraft below 20,000 feet and the valve 390 is of the "overbalanced" type, being of the sharp opening variety so that when the valve 120 is to open it may do so sharply, and similarly may be closed in the same manner. The guide extension 389 is traversed by a passage 402 so that fluid from the bore 372 passes from the latter through the passage 402 to the interiors of the sleeve member 392 and the closure member 394. When the valve 390 is seated, fluid supplied under pressure through the passage 402 acts against the outer end of the valve and counteracts the increase in pressure on the inner end of the valve produced by the fluid acting through the ports 386.

At 410 there is shown a cabin pressure vent valve mechanism controlling the escape of cabin pressure through a vent connection 411. The construction of this valve need not be described in this case, but it may be said that it may be of any suitable construction adapted to permit the escape of cabin pressure freely until a predetermined height, such as 8,000 feet, is attained; thereafter to maintain cabin pressure substantially constant for another increase in height of the aircraft to 30,000 feet, as may be desired; and thereafter to prevent the development of an undesirably high differential between cabin and ambient pressure. A valve suitable for this purpose is disclosed in my copending application Serial No. 468,938, filed December 14, 1942, now Patent No. 2,484,848, October 18, 1949, and is claimed therein.

Figures 9, 10:
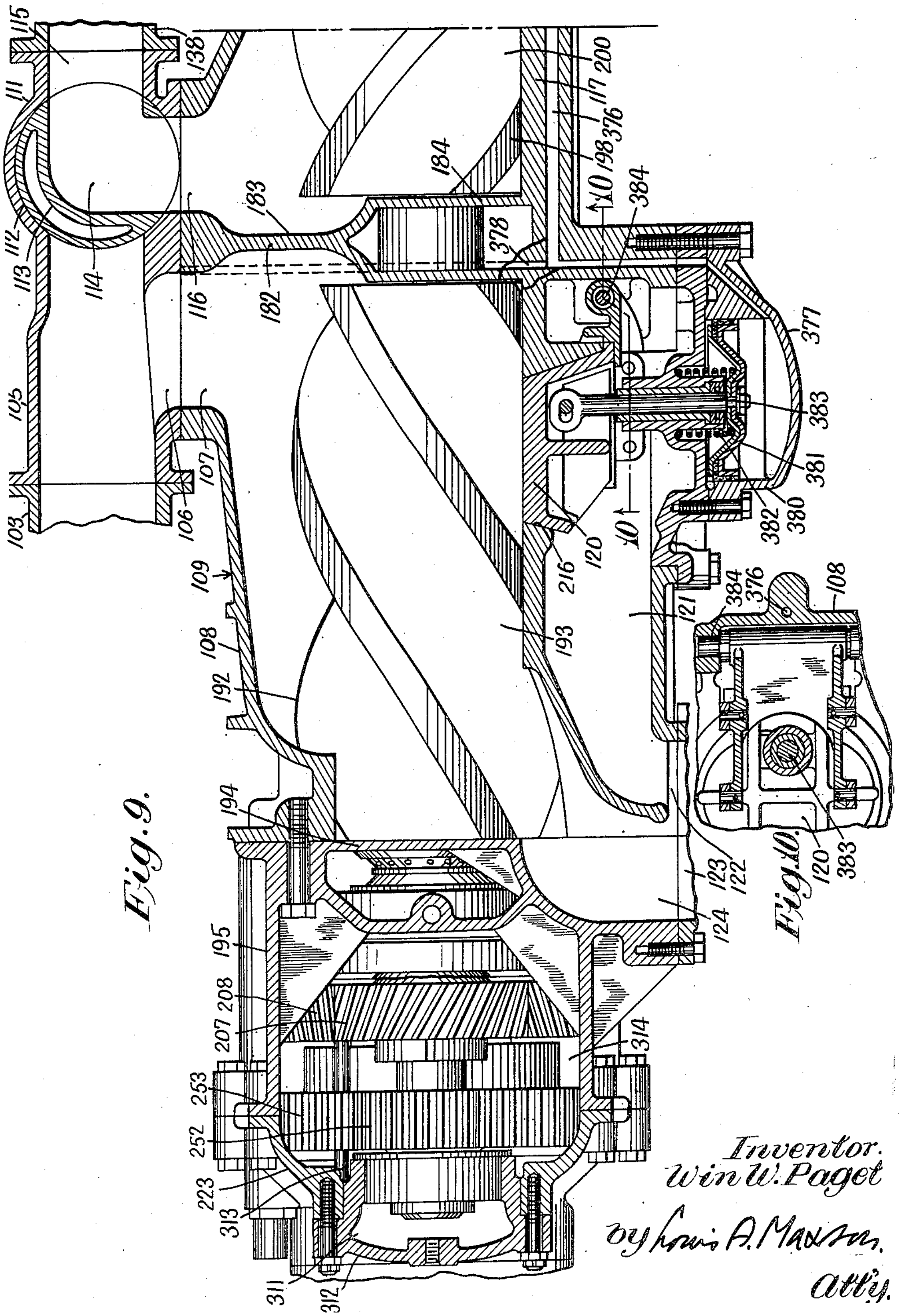
Fig. 9 is an enlarged horizontal section on the plane of the line 9—9 of Fig. 3, showing details of the unloading mechanism associated with the low pressure stage of said supercharger, and of a valve device associated with the high pressure stage of said supercharger, which high pressure stage is shown fragmentarily in Fig. 9.
Fig. 10 is a detail sectional view through the unloading mechanism of the low pressure stage of the supercharger taken on the plane of line 10—10 of Fig. 9.
Figures 11, 12, 13:
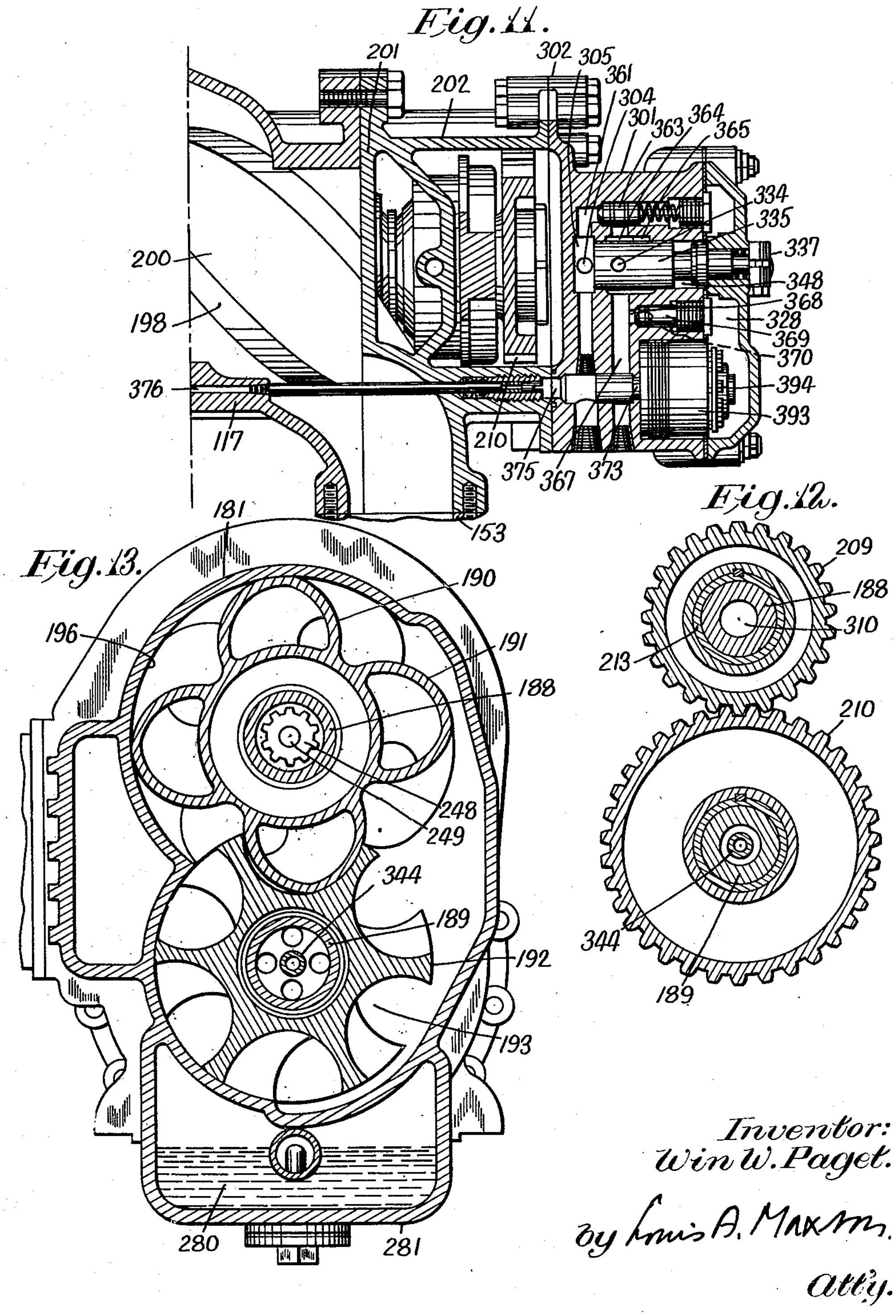
Fig. 11 is an enlarged fragmentary horizontal sectional view on the plane of the line 11—11 of Fig. 3, showing details of construction of the control device spacially associated with the high pressure end of the supercharger, and particularly illustrating controls utilized in governing the operation of the unloading device for the low pressure stage.
Fig. 12 is a fragmentary sectional view showing the timing gears associated with the high pressure stage of the supercharger, the section being taken on the plane of the line 12—12 of Fig. 7.
Fig. 13 is a transverse vertical section on the plane of the line 13—13 of Fig. 6.

When the aircraft is on the ground and ready to take off, the supercharger 109 will be operating with the valve 120 open, and accordingly there will be virtually no compression of the air in the first stage thereof except such as may exist by reason of back pressure, and the second stage of the supercharger will be operating single stage because the valve 113 will be in the position opposite that shown in Fig. 9. The air taken from the low pressure stage 108 will be delivered through the same without compression, as stated, and this air will be delivered to the conduit 123 and will be distributed by the valve 126 between the heat exchanger 130 and the space S1 automatically by means more fully disclosed in the application of which this present application is a division, namely, Serial No. 482,422, filed April 9, 1943, now Patent No. 2,444,951, July 13, 1948, for Cabin Conditions Controlling Apparatus. As the valve 113 is at this time in a position preventing the entrance of air from the space S1 to the second stage 117 of the supercharger, the air discharging from the outer course of the heat exchanger 130 will be discharged past the valve 158 and through the conduit 155 to the outside of the aircraft. The valve 158 will be open sufficiently to accomplish this discharge, for reasons which will shortly be explained. The second stage 117 of the supercharger is concurrently taking in air from the inlet 101 past the valve 113, whose passage 114 then connects the conduit 103 with the intake 116 of the second stage 117 of the supercharger. This air after compression will be delivered through the conduit 153. The mass flow of air in this conduit will be sufficient to cause the valve 158 to be maintained fully open under these conditions. The air discharging through the conduit 153 will pass through the conduit 148 and past the valve 145, whose position at this time will be at right angles to the position shown in Fig. 1, and enter the connection 143, which is a portion of the inner course of the heat exchanger 130; and the air will then pass through the heat exchanger 130 and discharge into the cabin through the conduit 140. A volume of air equal to that which is being continuously supplied through the conduit 140 will be discharged through the cabin vent valve device 410 when the aircraft reaches a height of, say, 20,000 feet. The free discharge of the oil pump 282 will be interrupted by the closure of the valve 390 and two things will occur: the valve 120 will be closed and thereafter all air taken into the low pressure stage 108 of the supercharger 109 will be compressed through the number of compressions for which this stage is designed, and, moreover, the oil pressure will be delivered to act upon the piston 174 and move the valve 113 to interrupt communication of the intake to the high pressure stage 117 of the supercharger 109 with the conduit 103 and establish communication between this intake and the conduit 138. Thereafter the pressurizing device will operate compound until the aircraft moves below an altitude at which the valve 390, which controls the flow of oil from the oil pump 282, reopens the free escape for the latter. The changes in rate of operation of the supercharger need not be detailed, as they will not affect the general mode of operation of the system but will instead simply cause the supercharger to be operated in the desired manner.

It will be observed that the means for unloading the low pressure stage is effective to reduce the pressure at which it discharges, but that the mass flow will remain unchanged.

While I have in this application specifically described one form which my invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In combination, in a supercharger, means forming a pair of intersecting rotor chambers, means forming another pair of intersecting rotor chambers, the chambers of one pair alined with the chambers of the other pair, helically formed rotors within said first chambers, oppositely helically formed rotors in said second chambers, common shafts for the alined rotors, and means including valve means for selectively connecting the adjacent ends of said rotors in communication with each other, or the remote end of one pair of rotors with the nearer end of the other.

2. In combination, a plural stage rotary compressor having an unloading device associated with its first stage and valve means associated with its second stage for selectively connecting the intake of said latter stage with the same source from which the first stage takes fluid or with the discharge of said first stage, and a common pressure responsive controlling device for said unloading device and for said valve means.

3. In combination, a plural stage rotary compressor having an unloading device associated with its first stage and valve means associated with its second stage for selectively connecting the intake of said latter stage with the same source from which the first stage takes fluid or with the discharge of said first stage, and altitude responsive means for controlling said unloading device and said valve means.

4. In combination, a plural stage rotary compressor having an unloading device associated with its first stage and valve means associated with its second stage for selectively connecting the intake of said latter stage with the same source from which the first stage takes fluid or with the discharge of said first stage, and altitude responsive means for controlling said unloading device and said valve means for effecting substantially simultaneous changes in the operating positions thereof.

5. In combination, a plural stage rotary compressor having an unloading device associated with its first stage and valve means associated with its second stage for selectively connecting the intake of said latter stage with the same source from which the first stage takes fluid or with the discharge of said first stage, and controlling means for said unloading device and said valve means including hydraulically actuated operating means for each of the same and an altitude controlled device for governing the delivery of a hydraulic operating fluid to said operating means.

6. In combination, a plural stage rotary compressor having an unloading device associated with its first stage and valve means associated with its second stage for selectively connecting the intake of said latter stage with the same source from which the first stage takes fluid or with the discharge of said first stage, and controlling means for said unloading device and said valve means including hydraulically actuated operating means for each of the same and an altitude controlled device for governing the substantially concurrent delivery of a hydraulic operating fluid under pressure to said operating means and its substantially concurrent venting therefrom.

7. In combination, a plural stage rotary compressor having an unloading device associated with its first stage and valve means associated with its second stage for selectively connecting the intake of said latter stage with the same source from which the first stage takes fluid or with the discharge of said first stage, and controlling means for said unloading device and said valve means including hydraulically actuated operating means for each of the same and an altitude controlled hydraulic pressure escape controlling device for governing the substantially concurrent delivery of a hydraulic operating fluid to said operating means and its substantially concurrent venting therefrom.

8. A compound supercharger having a lower pressure stage and a higher pressure stage, each normally compressing the fluid passing through the same, means for connecting the intake of the higher pressure stage to the intake of the lower pressure stage whereby the said high pressure stage becomes a low pressure stage, and means for unloading the low pressure stage effective to reduce the pressure at which it discharges while having its mass flow unchanged.

9. In a multistage supercharger, means for providing for two stages of compression, means for delivering fluid to the first stage and for discharging compressed fluid therefrom, means selectively operative to connect the second stage with said fluid delivering means or with the discharge means of the first stage, and means for controlling said selective connecting means automatically in accordance with the work demands on the supercharger.

10. In a multistage supercharger, means for providing for two stages of compression, means for supplying fluid to the first stage and for discharging compressed fluid therefrom, an unloading device associated with the first stage, means associated with the second stage for selectively connecting the second stage with the fluid supply means for the first stage or with the discharge means of said first stage, and means for controlling said unloading device and said connecting means for effecting substantially simultaneous changes in the operating positions thereof, said controlling means being automatically responsive to the work demands on the supercharger.

11. In apparatus of the rotary screw type, a casing, means for dividing the interior of said casing into two longitudinally separated chambers, a male rotor and a female rotor in one of said chambers, another male rotor and another female rotor in the other of said chambers, said rotors in each chamber having intermeshing spiral lobes and grooves cooperating with each other and with the inner surface of the chamber to form working spaces, said casing having for each of said chambers an inlet and an outlet, and valve means for connecting the inlet of one of said chambers with the inlet or with the outlet of the other.

12. In apparatus of the rotary screw type, a casing, means for dividing the interior of said casing into two longitudinally separated chambers, a male rotor and a female rotor in one of said chambers, another male rotor and another female rotor in the other of said chambers, said rotors in each chamber having intermeshing spiral lobes and grooves cooperating with each other and with the inner surface of the chamber to form working spaces, the lobes and grooves on corresponding rotors in the different chambers being of opposite hand, said casing having for each of said chambers an inlet and an outlet, the inlets being closely adjacent said dividing means, and means, including valve means, for connecting the inlet of one of said chambers with the inlet or with the outlet of the other.

13. In apparatus of the rotary screw type, a casing, means for dividing the interior of said casing into two longitudinally separated chambers, a male rotor and a female rotor in one of said chambers, another male rotor and another female rotor in the other of said chambers, said rotors in each chamber having intermeshing spiral lobes and grooves cooperating with each other and with the inner surface of the chamber to form working spaces, said casing having for each of said chambers an inlet and an outlet disposed at the opposite ends thereof and for one of said chambers another outlet between the ends thereof, and valve means for connecting the inlet of the other one of said chambers with the inlet or with the first mentioned outlet of said last mentioned one.

14. In apparatus of the rotary screw type, a casing, means for dividing the interior of said casing into two longitudinally separated chambers, a male rotor and a female rotor in one of said chambers, another male rotor and another female rotor in the other of said chambers, said rotors in each chamber having intermeshing spiral lobes and grooves cooperating with each other and with the inner surface of the chamber to form working spaces, said casing having for each of said chambers an inlet and an outlet disposed at the opposite ends thereof and for one of said chambers another outlet between the ends thereof, and valve devices for connecting the inlet of the other one of said chambers with the inlet or with the first mentioned outlet of said last mentioned one and for controlling said other outlet of said last mentioned chamber.

15. In apparatus of the rotary screw type, a casing, means for dividing the interior of said casing into two longitudinally separated chambers, a male rotor and a female rotor in one of said chambers, another male rotor and another female rotor in the other of said chambers, said rotors in each chamber having intermeshing spiral lobes and grooves cooperating with each other and with the inner surface of the chamber to form working spaces, said casing having for each of said chambers an inlet and an outlet disposed at the opposite ends thereof and for one of said chambers another outlet between the ends thereof, and valve devices for connecting the inlet of the other one of said chambers with the inlet or with the outlet of said last mentioned one and for closing said other outlet when the end outlet of said chamber is connected with the inlet of the other chamber.

WIN W. PAGET.

REFERENCES CITED

The following references are of record in the file of this patent:

UNITED STATES PATENTS

| Number | Name | Date |
|---|---|---|
| 1,508,707 | Moss | Sept. 16, 1924 |
| 1,508,731 | Standerwick | Sept. 16, 1924 |
| 1,523,698 | Losel | Jan. 20, 1925 |
| 1,580,973 | Rembold | Apr. 13, 1926 |
| 1,753,280 | Baumann et al. | Apr. 8, 1930 |
| 2,114,719 | Maniscalo | Apr. 19, 1938 |
| 2,205,793 | Hunt | June 25, 1940 |
| 2,208,428 | Nicolet | July 16, 1940 |
| 2,208,554 | Price | July 16, 1940 |
| 2,246,932 | Collins | June 24, 1941 |
| 2,444,951 | Paget | July 13, 1948 |
| 2,477,003 | Paget | July 26, 1949 |
| 2,484,848 | Paget | Oct. 18, 1949 |

FOREIGN PATENTS

| Number | Country | Date |
|---|---|---|
| 2,202 | Great Britain | 1899 |
| 308,445 | Great Britain | 1929 |